United States Patent
Dong et al.

[11] Patent Number: 5,881,197
[45] Date of Patent: Mar. 9, 1999

[54] OPTICAL FIBRE AND OPTICAL FIBRE DEVICE

[75] Inventors: Liang Dong; Laurence Reekie; David Neil Payne, all of Southampton, United Kingdom

[73] Assignee: University of Southampton, Southampton, United Kingdom

[21] Appl. No.: 810,128

[22] Filed: Feb. 25, 1997

[30] Foreign Application Priority Data

Feb. 14, 1997 [GB] United Kingdom .................. 9703078

[51] Int. Cl.[6] .................................................. G02B 6/00
[52] U.S. Cl. ........................................ 385/127; 385/142
[58] Field of Search .................................... 385/141–144, 385/123, 124, 126, 127; 372/6

[56] References Cited

U.S. PATENT DOCUMENTS

| | | | |
|---|---|---|---|
| 4,515,436 | 5/1985 | Howard et al. | 350/96.33 |
| 4,529,426 | 7/1985 | Pleibel et al. | 65/3.11 |
| 4,529,427 | 7/1985 | French | 65/3.12 |
| 5,506,925 | 4/1996 | Greene et al. | 385/129 |
| 5,561,675 | 10/1996 | Bayon et al. | 372/6 |
| 5,627,933 | 5/1997 | Ito et al. | 385/123 |
| 5,647,038 | 7/1997 | Minden et al. | 385/37 |

Primary Examiner—Hung N. Ngo
Attorney, Agent, or Firm—Renner, Otto, Boissell & Sklar, P.L.L.

[57] ABSTRACT

An optical fiber has a cladding glass layer surrounding a glass core, in which a region (preferably annular) of the optical fiber partially overlapping the cladding and/or the core is formed of photosensitive glass.

28 Claims, 7 Drawing Sheets

OPTICAL FIBRE AND OPTICAL FIBRE DEVICE

BACKGROUND OF THE INVENTION

1. Field of the Invention

This invention relates to optical fibres and optical fibre devices such as, for example, optical fibre Bragg gratings and single frequency optical fibre lasers.

2. Description of the Prior Art

Optical fibre Bragg gratings are periodic refractive index modulations impressed in either the cladding or the core (or both) of an optical fibre. In order to write the grating, a suitable fibre usually has a photosensitive core and/or a photosensitive cladding. A glass is photosensitive when its refractive index can be modified (usually, for these purposes, substantially permanently) by optical radiation.

A uniform fibre grating reflects light only at a certain resonant wavelength (the Bragg wavelength) characteristic of the grating pitch, fibre parameters and the transverse field distribution of the guided light. As a narrow band device, it has many applications such as reflectors for fibre lasers, band-stop filters, band-pass filters, or sensing elements in optical fibre sensors. An important application of fibre gratings is in single frequency fibre lasers.

A single frequency fibre laser can be constructed in two different ways. In the first implementation, a distributed Bragg reflector (DBR) laser, two reflectors are placed a short distance apart in a doped fibre (typically a few centimeters apart). One of the reflectors is a fibre grating which only reflects a narrow wavelength band of light around the Bragg wavelength; the other one can be a fibre grating or a broad band reflector such as a metal coated mirror. When the cavity length is in the other of few centimetres, the longitudinal modes of the cavity are spaced far apart. If only one of these longitudinal modes lies within the reflection spectrum of the narrow band reflector, the laser operates at single longitudinal mode. The laser can be tuned either by heating, stretching or compressing the fibre grating or gratings to change their reflection response [publication reference 1].

In a second implementation, a distributed feedback (DFB) laser, a single grating is written in which the refractive index modulation has an abrupt $\pi/2$ phase shift at a point along the grating's length. This implementation potentially offers more stable mode operation.

A very common fibre for implementation of single frequency fibre laser is erbium-doped germanosilicate fibre, typically co-doped with aluminium. The erbium doping gives a lasing wavelength around the telecommunication system operation wavelength of 1.55 $\mu$m (micrometers), and the germanium content gives the fibre photosensitivity which allows gratings to be written in this fibre easily. The laser is typically pumped by a readily available 980 nm (nanometer) semiconductor laser diode. However, this arrangement has the disadvantage that even with the highest possible erbium doping level available in this type of glass fibre, only a small proportion of the available pump light can be absorbed. This gives a low efficiency and only a small output power from the laser, typically less than 1 mW (milliWatt). This is not sufficient for most applications. A master oscillator post-amplifier (MOPA) arrangement can be used to increase the output power, in which the unabsorbed pump (emerging from the laser with the laser output) is used to pump a section of the fibre downstream of the laser, to act as an amplifier to give a few mW of total output power [2,3]. However, the low output power of the master oscillator laser means that the noise of a MOPA device is usually high.

An alternative is to use an erbium and ytterbium doped fibre. The ytterbium ions can be pumped at approximately 980 nm, but with some two orders of magnitude larger absorption than that of an erbium (only) doped system. The pump energy absorbed by the ytterbium ions eventually transfers to erbium ions which in turn lase at approximately 1.55 $\mu$m. This provides a very efficient single frequency laser of few centimeters long with output power in the range of tens of mW. An efficient energy transfer from ytterbium to erbium requires a high phonon energy glass host. The best efficiency demonstrated so far is achieved in phosphosilicate fibre doped with some aluminium.

However, the erbium/ytterbium fibre has the disadvantage that useable gratings can only be written in such fibres with hydrogenation[1] which, although efficient, makes the writing more difficult and reduces the laser efficiency by introducing a background pump absorption [4].

[1] A low temperature hydrogen loading technique allowing very strong gratings to be written. A pre-fabricated optical fibre is placed in a high pressure hydrogen cell at room temperature for a few days to a few weeks to allow hydrogen to diffuse into the core region of the fibre. A grating is written in the fibre before the hydrogen diffuses out.

Co-doping of erbium/ytterbium doped fibres with tin has also been attempted, which does allow gratings to be written [5], but the photosensitivity is still not strong enough to allow gratings to be written with ease, nor to allow very strong gratings to be written for laser implementations. Another disadvantage of using tin doping is that it affects the optimal glass composition for efficient energy transfer from ytterbium to erbium ions. A reduction of laser efficiency has been seen [5].

A further problem with lasers based on previously proposed fibre gratings is that the output at the two different polarisation modes from a laser are at different wavelengths due to the birefringence of the cavity (so that the different polarisation sees a different effective refractive index, and therefore a different optical cavity length). This is normally not desirable, as it introduces an extra wavelength component in the laser's output spectrum, broadening the spectrum.

It is an object of the invention to provide a fibre which allows a strong grating to be written to provide an efficient laser, but without the difficult fabrication steps of hydrogen loading or the detrimental effects of certain other co-dopants.

SUMMARY OF THE INVENTION

This invention provides an optical fibre having a cladding glass layer surrounding a glass core, in which a region (preferably annular) of the optical fibre partially overlapping the cladding and/or the core is formed of photosensitive glass.

Using this fibre configuration, a grating can easily be written into the annular region by a standard technique (for example, by transverse exposure to ultraviolet interference fringes or by exposure through a phase mask). The grating formed in the annular region of the fibre then provides normal grating properties, such as narrow-band reflection.

A benefit of this arrangement is that the glass composition used in the core can be selected for most efficient operation as, for example, a laser, and does not have to be compromised by photosensitive dopants to allow a grating to be written into the core. Similarly, the photosensitivity of the annular region can be increased, to make the grating fabrication easier, without having to be concerned about the detrimental effects that this might have on the core as a whole.

Preferred embodiments of the invention provide a photosensitive erbium/ytterbium doped optical fibre which allow very strong gratings (99.9%) of just few millimeters long to be written in the fibre and at the same time does not rely on co-dopants which detrimentally affect the core composition for an efficient erbium/ytterbium energy transfer.

In preferred embodiments of this invention, a very photosensitive ring is placed around an erbium/ytterbium doped core. The ring can be a part of the core or part of the cladding depending whether it has a higher refractive index than that of the cladding glass. The host glass for erbium and ytterbium ions is not affected. Due to the reduction of overlap between the photosensitive region and the guided optical modes, a reduction of grating strength is expected comparing to the case where the photosensitive region is throughout the fibre core. But very strong gratings can still be achieved if a highly photosensitive glass is used.

A preferred configuration includes a region of highly photosensitive cladding (index matched to that of the rest of the cladding, thereafter called index matched) around an erbium/ytterbium doped core. In this configuration, the doped core is not affected both in its composition and its overlap with the guided optical mode. For the dopants, the fibre would be the same as a conventional doped fibre.

In other embodiments, the annular region can partially overlap the core (e.g. at the radial periphery of the core). This can give a greater overlap between the guided light and a grating formed in the photosensitive annular region, but this advantage has to be balanced against the difficulty in doping the part of the core overlapped by the annular region so that it has useful properties as an amplifier (if required) and as a photosensitive region. However, these problems are reduced if the overlap is only relatively small compared to the diameter of the core.

The above and other objects, features and advantages of the invention will be apparent from the following detailed description of illustrative embodiments which is to be read in connection with the accompanying drawings, in which:

FIG. 2b is a schematic graph illustrating optical properties of a grating fabricated by the process of FIG. 2a;

Figure 4A:
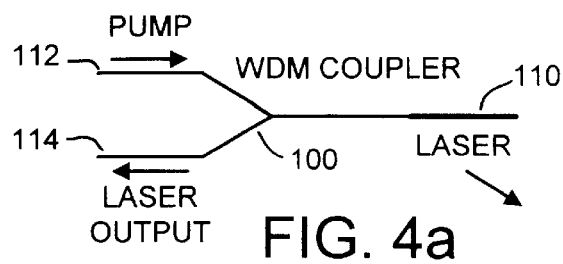
Figure 4B:
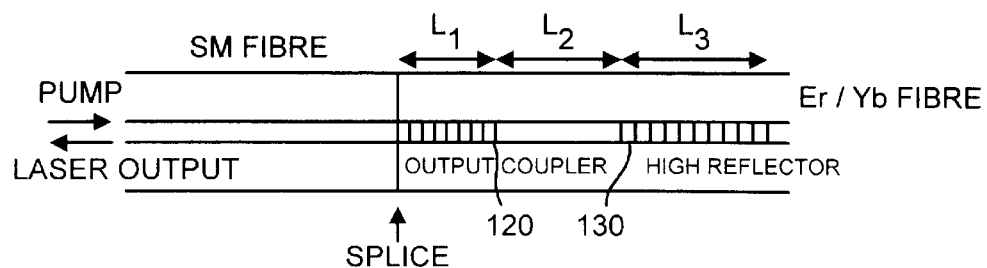
Figure 4C:
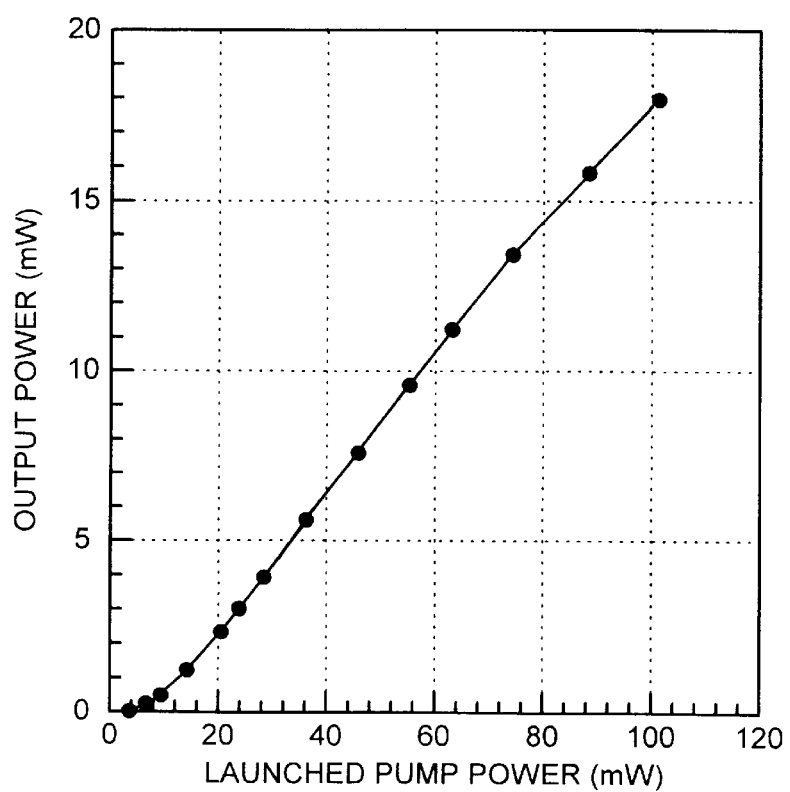
Figure 5A:
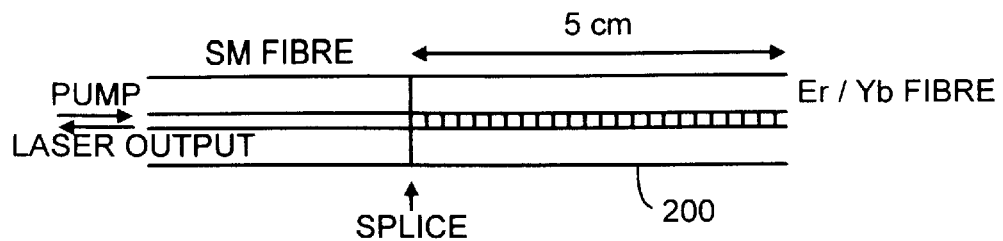

FIGS. 4a and 4b schematically illustrate a DBR laser;

FIG. 4c is a graph schematically illustrating the performance of the DBR laser of FIGS. 4a and 4b;

FIG. 5a schematically illustrates a DFB laser; and

Figure 5B:
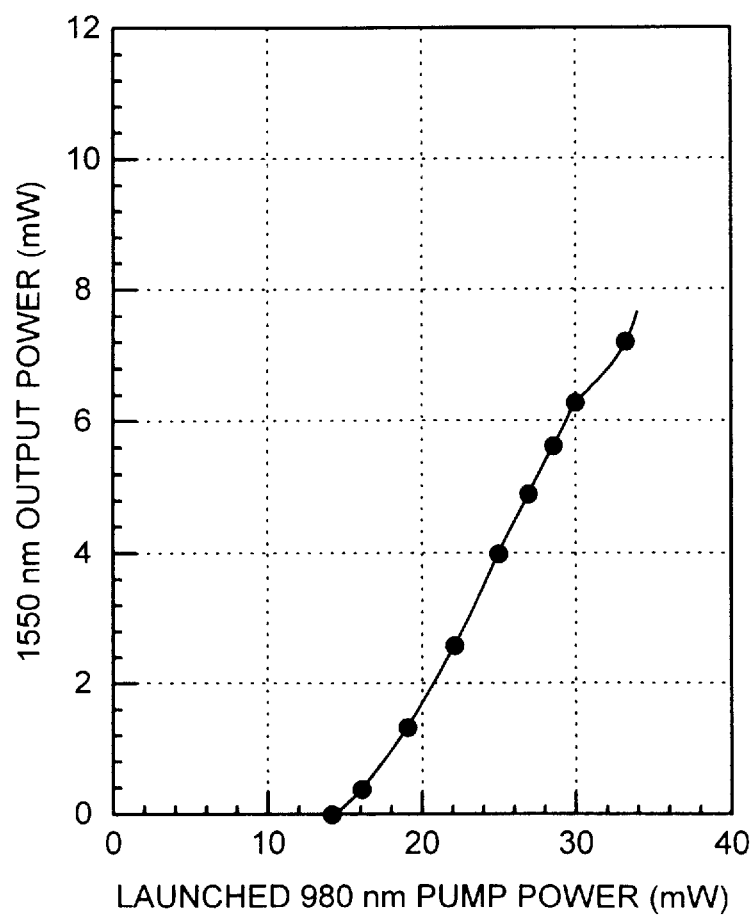

FIG. 5b is a graph schematically illustrating the performance of the DFB laser of FIG. 5a.

Most of the current state of art technology for silica optical fibre manufacture is based on a chemical vapour deposition process [6]. With this technology, a strongly photosensitive region can be produced in a silica glass optical fibre by doping a combination of appropriate amount of Ge (germanium), Sn (tin), B (boron) and F (fluorine). Ge and Sn doping has the effect of raising the refractive index and B and F doping reduce the refractive index. Appropriate combination can be used to achieve a desired refractive index.

The present embodiments use an example of an optical fibre with an Er/Yb (Erbium/Ytterbium) doped phosphosilicate core (e.g. 500 parts per million (ppm) $Er^{3+}$; 2000 ppm $Yb^{3+}$) with Ge/B doped photosensitive regions. Three embodiments of the fibre will be described, with reference to FIGS. 1a to 1c; FIGS. 1d to 1f; and FIGS. 1g to 1i respectively.

DESCRIPTION OF THE PREFERRED EMBODIMENTS

Figure 1A:
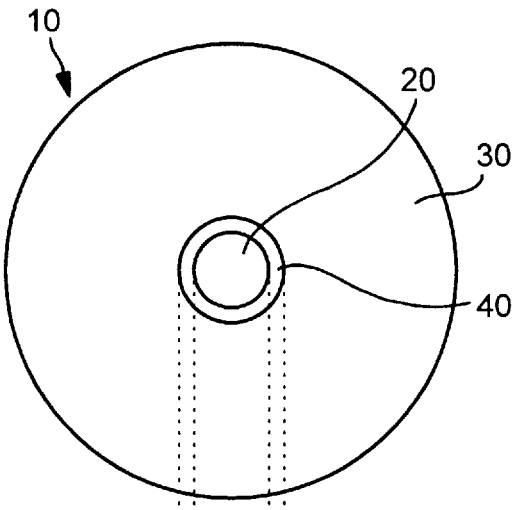
FIGS. 1a to 1c are a schematic cross sections of an optical fibre according to a first embodiment of the invention, a schematic representation of the refractive index profile across the fibre and a schematic representation of the photosensitivity profile across the fibre.
Figure 1B:
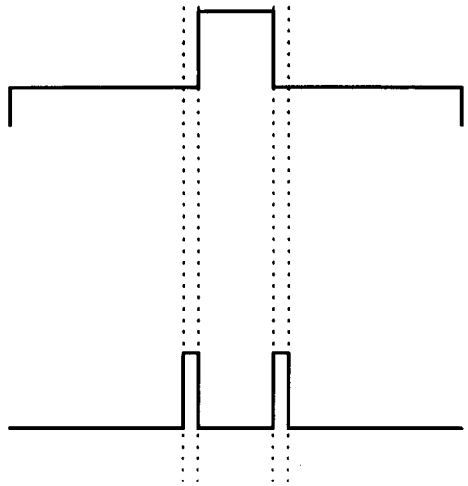

FIG. 1a is a schematic cross section of an optical fibre 10; FIG. 1b is a schematic representation of the fibre's refractive index profile; and FIG. 1c is a schematic representation of the fibre's photosensitivity profile.

The fibre 10 comprises a light-guiding core 20 and a glass cladding 30. As shown in FIG. 1b, the core has a raised refractive index with respect to that of the cladding. In the cross section of FIG. 1a, the core is represented by the area enclosed by the innermost circle, and the cladding by the area enclosed between the innermost circle and the outermost circle.

Typically, the diameter of the core in these embodiments is ~ (about) 5 μm; the outer diameter of the cladding ~125 μm; and the refractive index difference between the core and cladding ~0.013.

Figure 1C:
Figure 1D:
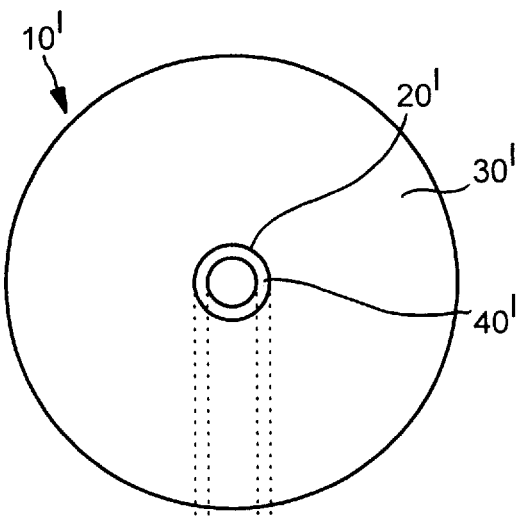
FIGS. 1d to 1f are a schematic cross sections of an optical fibre according to a second embodiment of the invention, a schematic representation of the refractive index profile across the fibre and a schematic representation of the photosensitivity profile across the fibre.
Figure 1E:
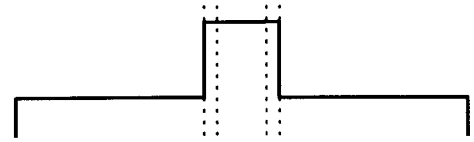
Figure 1F:
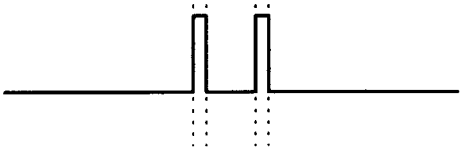

FIG. 1c schematically illustrates the variation in photosensitivity across the diameter of the fibre 10. An annular (or open-cylindrically-shaped) region 40 about 3 μm thick and surrounding the core 20 is made photosensitive by doping with Ge and B, whereas the core 20 and most of the cladding 30 are substantially not photosensitive (or at least much less photosensitive than the region 40).

In the examples of FIG. 1a to 1h, the photosensitive region is annular. However, circularly asymmetrical photosensitive regions are also possible.

The dopants used to render the region 40 photosensitive are matched so that the refractive index of the region 40 is similar (or as identical as reasonably possible) to that of the remainder of the cladding. So, in the absence of any photo-induced refractive index variation in the region 40, the fibre would behave optically as though the region 40 were formed of the same glass as the remainder of the cladding. However, a small discrepancy can be tolerated.

Using this fibre configuration, a grating can be written into the region 40 by a standard technique (for example, by transverse exposure to ultraviolet interference fringes or by exposure through a phase mask). The grating formed in the region 40 of the fibre then provides normal grating properties, such as narrow-band reflection.

A benefit of this arrangement is that the glass composition used in the core can be selected for most efficient operation as, for example, a laser, and does not have to be compromised by photosensitive dopants to allow a grating to be written into the core.

The fibre 10 supports only one spatial mode at the laser wavelength. The thickness of the B/Ge/Si (Si: silicon) ring is typically larger than the core radius. An example of the fibre 10 has a NA (numerical aperture) of approximately 0.2 and supports a single spatial mode above 1250 nm.

FIGS. 1*d* to 1*f* schematically illustrate an optical fibre 10' according to a second embodiment of the invention. The fibre 10' has a core 20' and a cladding 30' of the same size as those of the fibre 10 of FIG. 1*a*. Again, FIG. 1*e* illustrates that the core 20' has a raised refractive index with respect to that of the cladding 30'.

Referring to FIG. 1*f*, an annular region 40' is made photosensitive by appropriate doping (e.g. with B or Ge). The region 40' is within the core 20', at the radial periphery of the core 20'. The dopants are selected and balanced so that the refractive index of the region 40' is substantially the same as that of the core 20', so that in the absence of an impressed refractive index modulation, the fibre behaves optically as though the core glass composition was uniform across the core.

Figure 1G:
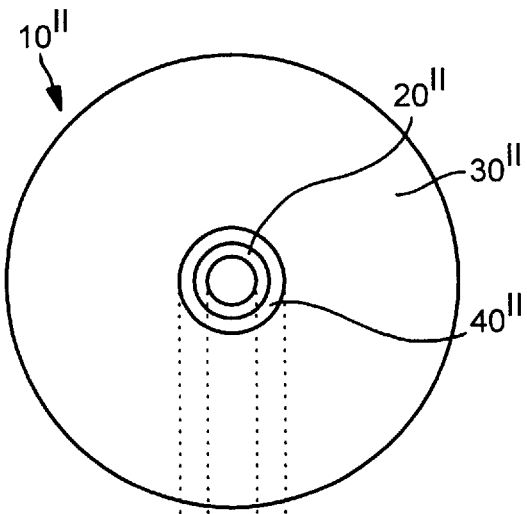
FIGS. 1g to 1i are a schematic cross sections of an optical fibre according to a third embodiment of the invention, a schematic representation of the refractive index profile across the fibre and a schematic representation of the photosensitivity profile across the fibre.
Figure 1H:
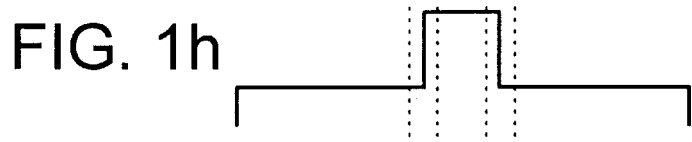
Figure 1I:

FIG. 1*g* to 1*i* show corresponding features of a fibre 10" according to a third embodiment of the invention, having a core 20" and a cladding 30".

In the fibre 10", an annular photosensitive region 40" overlaps part of the core and part of the cladding. Again, the doping is such that the refractive index of the region 40" is matched (for an inner part of the region 40") to that of the core 20", and (for an outer part of the region 40") to that of the cladding 30".

In these embodiments, two or more photosensitizing dopants are used in the annular region. The dopants are selected so that they affect the refractive index of the doped glass in opposite senses (directions). In this way, the glass of the region can be made photosensitive but without necessarily changing its refractive index with respect to adjacent non-doped glass. So, the intention is that the refractive index of glass of the annular region which lies within the core should be substantially equal to the refractive index of the remainder of the core; and that the refractive index of glass of the annular region which lies within the cladding should be substantially equal to the refractive index of the remainder of the cladding.

Some examples of suitable dopants are listed below.
1) Photosensitizing dopants which depress the refractive index of silica glass:
   $B_2O_3$: refractive index change is $-4.65 \times 10^{-4}$ per mol % of $B_2O_3$
   F: refractive index change is $-4.5 \times 10^{-3}$ per mol % of F
2) Photosensitizing dopants which raise the refractive index of silica glass:
   $GeO_2$: refractive index change is $+1.32 \times 10^{-3}$ per mol % of $GeO_2$
   $SnO_2$: refractive index change is $+2.06 \times 10^{-2}$ per mol % of $SnO_2$ So, an example of a suitable formulation of dopants to achieve substantially zero change in refractive index (i.e. so the annular region's index matches that of the respective adjacent glass) would be 20 mol % $B_2O_3$ and 7 mol% $GeO_2$.

Figure 2A:
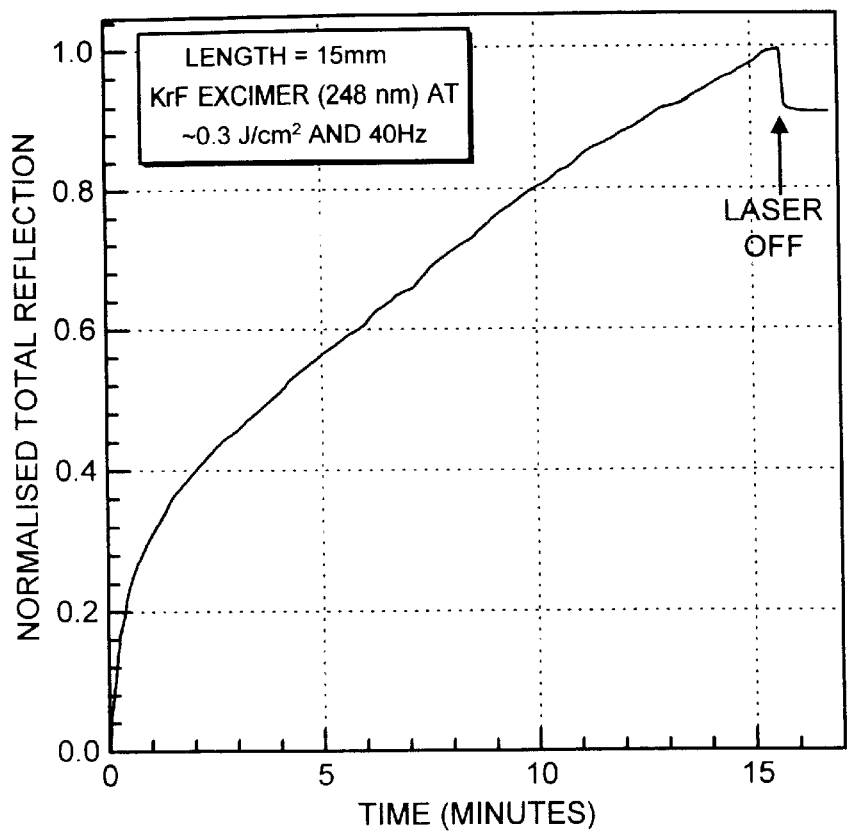
FIG. 2a is a schematic graph illustrating a process of grating formation in a test fibre with an index matched B/Ge doped cladding ring.

FIG. 2*a* illustrates grating formation in a fibre 10 by transverse exposure of the fibre to a fringe pattern from a 248 nm KrF (Krypton Fluoride) excimer laser. The grating length is 15 mm (millimeters), writing time is approximately 16 minutes at a pulse energy of approximately 0.3 J/cm² and a repetition rate of 40 Hz (Hertz). FIG. 2*a* shows the normalised total reflection of the grating during its formation against time. The normalised total reflection reaches a peak of about 90% once the writing laser has been turned off.

Figure 2B:
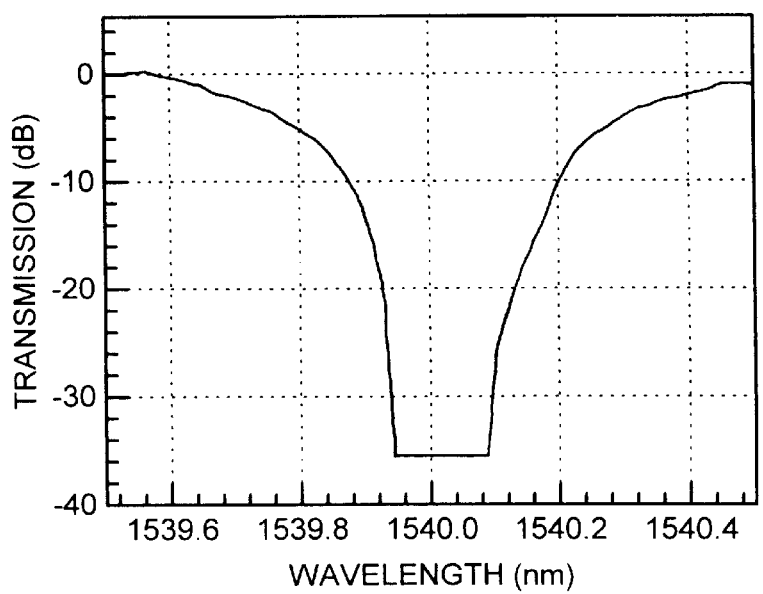

As shown in FIG. 2*b*, the resulting grating has a peak transmission loss larger than 35 dB (decibels).

Figure 3:
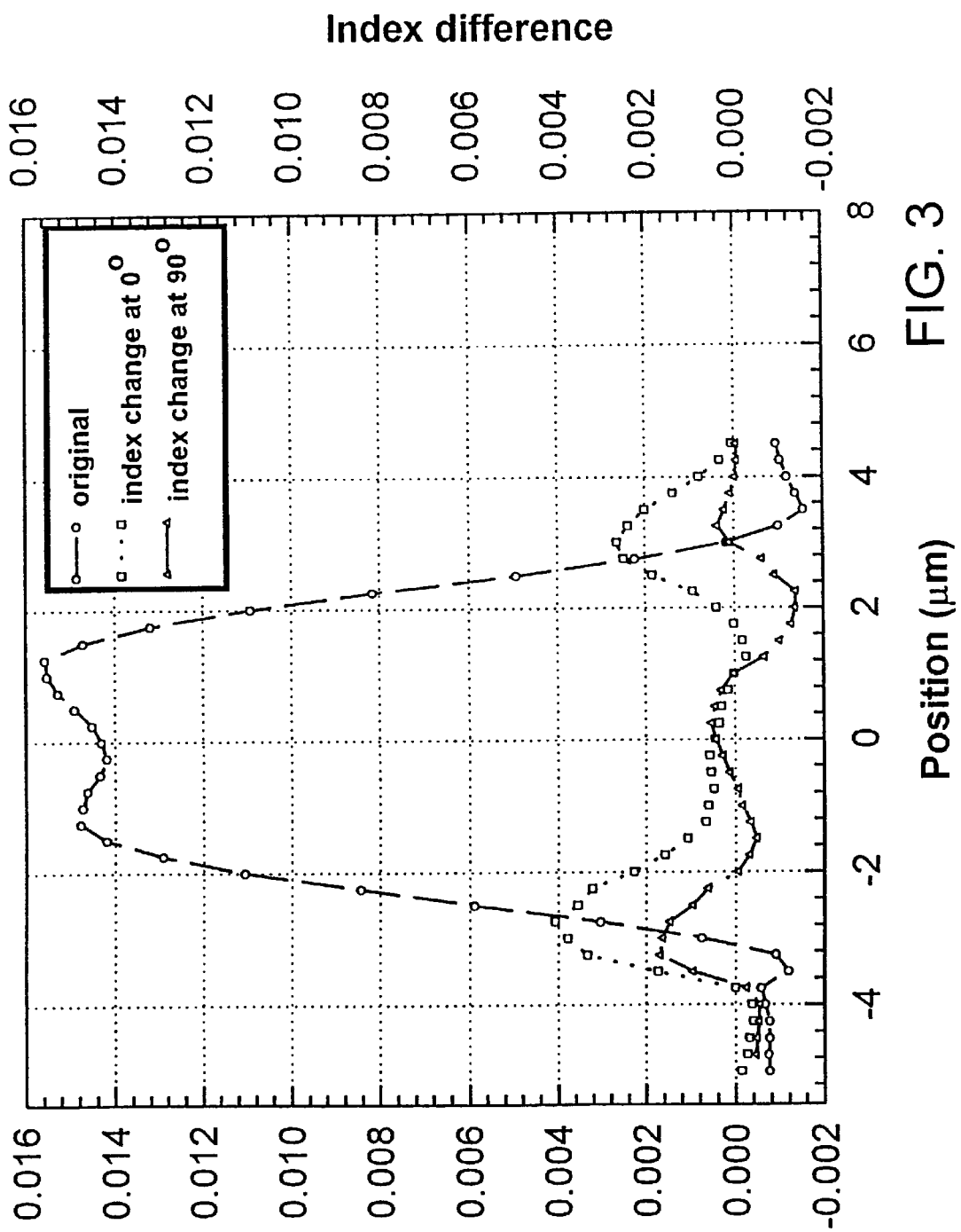
FIG. 3 is a schematic graph illustrating the UV-induced index change profile in the test fibre.

FIG. 3 is a graph schematically illustrating the measured refractive index across a diameter of the fibre 10 before exposure, and the refractive index changes when a grating is impressed on the photosensitive region of the fibre.

The curve illustrating the refractive index before exposure shows the structure of the core, where the refractive index is (in this example) raised with respect to that of the cladding. The radius of the core is seen to be about 3.5 μm.

The curves illustrating the refractive index change are measured across the diameter of the fibre 10 along two orthogonal axes. One of these axes ("0°") is substantially parallel to the light of the grating writing beam, and the other ("90°")is substantially perpendicular to the writing beam. It can be seen that the greatest refractive index change occurs at the photosensitive annular region, and that between the two curves the greater change occurs along the writing beam.

FIGS. 4*a* and 4*b* schematically illustrate a DBR laser formed using the fibre 10, and FIG. 4*c* schematically illustrates the performance of such a DBR laser.

Referring to FIGS. 4*a* and 4*b*, the output port of a WDM (wavelength division multiplexing) coupler 100 is spliced to the DBR laser 110 which consists of two gratings 120, 130 spaced 20 mm apart. The grating 120 nearer to the splice has a reflectivity of 90% and a length of 5 mm. This is referred to as an output coupler grating. The second grating 130 has a reflectivity larger than 99% and a length of 15 mm, and is referred to in FIG. 4*b* as the high reflector grating. The gratings are written by a 248 nm KrF excimer laser with an interferometer arrangement as described above.

Pump light at 980 nm is coupled to the laser through one input port 112 of the WDM coupler 110 and the laser output is coupled out through the other port 114 of the WDM coupler 110.

The lasing wavelength of the laser is at 1535 nm. Referring to FIG. 4*c*, the lasing threshold is approximately 4 mW and the slope efficiency is approximately 25% after taking into consideration of the 1 dB loss of the isolator and approximately 0.5 dB of splice loss. The laser operates in a single frequency and single polarisation mode for output powers up to 8 mW, beyond which the second polarisation mode starts lasing as well. In another prototype embodiment of a DBR laser with lower output coupler coupling (higher reflectivity of the first grating), the threshold is found to be sub-mW, attesting to the low intrinsic loss of these laser cavity.

FIG. 5*a* schematically illustrates a DFB laser formed in the fibre 10. The configuration of the laser is similar to that of the DBR laser, apart from the fact that a single fibre grating 200 having a phase discontinuity at a point along its length is used for the laser cavity. The grating length is 50 mm, and its reflectivity centered at 1550.2 nm. It is written by transverse exposure to fringes from a frequency doubled Ar (argon) ion laser with a phasemask arrangement.

Despite the higher threshold (14 mW) for this laser (shown in FIG. 5*b*) the efficiency with respect to launched pump power is also approximately 25%, after taking into consideration again the 1 dB isolator insertion loss and approximately 0.5 dB splice loss. The DFB laser operates in a single frequency and single polarisation mode up to 6 mW of output power.

The single polarisation mode operation of the lasers is in contrast to the dual polarisation mode operation observed in previous lasers fabricated with the photosensitive region in the core. Single polarised lasers are desired for most applications, i.e. as source for use in optical fibre transmission systems.

The efficiency of the lasers are primarily limited by the efficiency of the fibre itself, which was measured to be approximately 25% in a simple cavity configuration where the cleaved end face was used as the reflectors.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

PUBLICATION REFERENCES (All hereby incorporated herein by reference)

1. G A Ball and W W Morey: "Compression-tuned single frequency Bragg grating fibre laser", Optics Letters, 19, pp. 1979–1981, 1994.

2. V Mizrahi, D J DiGiovanni, R M Atkins, S G Grubb, Y K Park and J P Delavaux: "Stable single-mode erbium fibre-grating laser for digital communication", Journal of Lightwave Technology, 11, pp. 2021–2025.

3. M Sejka, P Varming, J Hübner and M Kristensen: "Distributed feedback Er$^+$-doped fibre laser", Electronics Letters, 31, pp. 1445–1446, 1995.

4. J T Kringlebotn, J-L Archambault, L Reekie and D N Payne: "Er3+:Yb3+-co-doped fibre distributed-feedback laser", Optics Letters, 19, pp. 2101–2103.

5. W H Loh, L Dong and J E Caplen: "Single-sided output Sn/Er/Yb distributed feedback fibre lasers", Applied Physics Letters, 69, pp. 2151–2153, 1996.

6. S R Nagel, J B MacChesney and K L Walker: "An Overview of the Modified Chemical Vapour Deposition (MCVD) Process and Performance", IEEE Journal of Quantum Electronics, QE-18, No 4, pp. 459–475, 1982.

We claim:

1. An optical fibre having:
    (i) a glass core doped with Erbium and ytterbium; and
    (ii) a cladding glass layer surrounding said glass core;
    in which a region of said optical fibre partially overlapping said cladding layer and/or said core is formed of photosensitive glass.

2. A fibre according to claim 1, in which said region formed of photosensitive glass is substantially annular in shape.

3. A fibre according to claim 1, in which:
    said region formed of photosensitive glass partially overlaps said cladding layer;
    said region formed of photosensitive glass has a refractive index;
    said cladding layer has a refractive index; and
    said refractive index of that part of said region overlapping said cladding layer is substantially equal to said refractive index of a non-overlapped remainder of said cladding layer.

4. A fibre according to claim 2, in which:
    said region formed of photosensitive glass partially overlaps said cladding layer;
    said region formed of photosensitive glass has a refractive index;
    said cladding layer has a refractive index; and
    said refractive index of that part of said region overlapping said cladding layer is substantially equal to said refractive index of a non-overlapped remainder of said cladding layer.

5. A fibre according to claim 1, in which:
    said region formed of photosensitive glass partially overlaps said core;
    said region formed of photosensitive glass has a refractive index;
    said core has a refractive index; and
    said refractive index of that part of said region overlapping said core is substantially equal to said refractive index of a non-overlapped remainder of said core layer.

6. A fibre according to claim 2, in which:
    said region formed of photosensitive glass partially overlaps said core;
    said core has a refractive index; and
    said refractive index of that part of said region overlapping said core is substantially equal to said refractive index of a non-overlapped remainder of said core layer.

7. A fibre according to claim 3, in which:
    said region formed of photosensitive glass partially overlaps said core;
    said core has a refractive index; and
    said refractive index of that part of said region overlapping said core is substantially equal to said refractive index of a non-overlapped remainder of said core layer.

8. A fibre according to claim 4, in which:
    said region formed of photosensitive glass partially overlaps said core;
    said core has a refractive index; and
    said refractive index of that part of said region overlapping said core is substantially equal to said refractive index of a non-overlapped remainder of said core layer.

9. A fibre according to claim 3, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

10. A fibre according to claim 4, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

11. A fibre according to claim 5, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

12. A fibre according to claim 6, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

13. A fibre according to claim 7, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

14. A fibre according to claim 8, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

15. A fibre according to claim 1, in which said region formed of photosensitive glass is doped with at least two photosensitizing dopants, at least one of said photosensitizing dopants influencing said refractive index of glass doped with that dopant to increase, and at least one of said photosensitizing dopants influencing said refractive index of glass doped with that dopant to decrease.

16. A fibre according to claim 9, in which said photosensitizing dopants comprise at least Boron and Germanium.

17. A fibre according to claim 11, in which said photosensitizing dopants comprise at least Boron and Germanium.

18. A fibre according to claim 13, in which said photosensitizing dopants comprise at least Boron and Germanium.

19. An optical fibre grating formed from an optical fibre according to claim 1.

20. An optical fibre laser comprising one or more optical fibre gratings according to claim 19.

21. A distributed feedback optical fibre laser comprising a grating according to claim 19.

22. A distributed Bragg reflector laser comprising at least one grating according to claim 19.

23. An optical fibre grating formed by exposing a photosensitive optical fibre to a spatially varying writing light pattern to impress refractive index variations on said photosensitive optical fibre, said fibre having:
(i) a glass core doped with Erbium and ytterbium; and
(ii) a cladding glass layer surrounding said glass core;
in which a region of said optical fibre partially overlapping said cladding layer and/or said core is formed of photosensitive glass.

24. An optical fibre distributed reflector laser comprising:
a length of amplifying optical fibre; and
two reflectors connected at respective ends of said length of amplifying optical fibre to at least partially reflect light emerging from said length of amplifying optical fibre back though said length of amplifying optical fibre;
at least one of said reflectors being an optical fibre grating formed by exposing a photosensitive optical fibre to a spatially varying writing light pattern to impress refractive index variations on said photosensitive optical fibre, said fibre having:
(i) a glass core doped with Erbium and ytterbium; and
(ii) a cladding glass layer surrounding said glass core;
in which a region of said optical fibre partially overlapping said cladding layer and/or said core is formed of photosensitive glass.

25. An optical fibre distributed feedback laser comprising:
a length of amplifying optical fibre; and
an optical fibre grating impressed on said length of amplifying optical fibre, said grating being formed by exposing a photosensitive optical fibre to a spatially varying writing light pattern to impress refractive index variations on said photosensitive optical fibre, said fibre having:
(i) a glass core doped with Erbium and ytterbium; and
(ii) a cladding glass layer surrounding said glass core;
in which a region of said optical fibre partially overlapping said cladding layer and/or said core is formed of photosensitive glass.

26. An optical fibre having:
(i) a glass core doped with Erbium and ytterbium and having a refractive index; and
(ii) a cladding glass layer surrounding said glass core, said cladding layer having a refractive index;
in which a region of said optical fibre partially overlapping said cladding layer and/or said core is formed of photosensitive glass;
in which:
said region formed of photosensitive glass partially overlaps said core and/or said cladding layer;
in a case where said region formed of photosensitive glass partially overlaps said cladding layer, said refractive index of that part of said region overlapping said cladding layer is substantially equal to said refractive index of a non-overlapped remainder of said cladding layer; and
in a case where said region formed of photosensitive glass partially overlaps said core, said refractive index of that part of said region overlapping said core is substantially equal to said refractive index of a non-overlapped remainder of said core layer.

27. An optical fibre having:
(i) a glass core doped with Erbium and ytterbium; and
(ii) a cladding glass layer surrounding said glass core;
in which a part of said cladding layer and/or a part of said core is formed of photosensitive glass.

28. An optical fibre having:
(i) a glass core doped with Erbium and ytterbium; and
(ii) a cladding glass layer surrounding said glass core;
in which said glass of a part of said cladding layer and/or a part of said core is doped with one or more photosensitising dopants.

* * * * *